Nov. 9, 1971    C. H. LINDBERG    3,618,175
VISUAL AID

Filed Dec. 23, 1968    6 Sheets-Sheet 1

TRANSLUCENT

Charles H. Lindberg

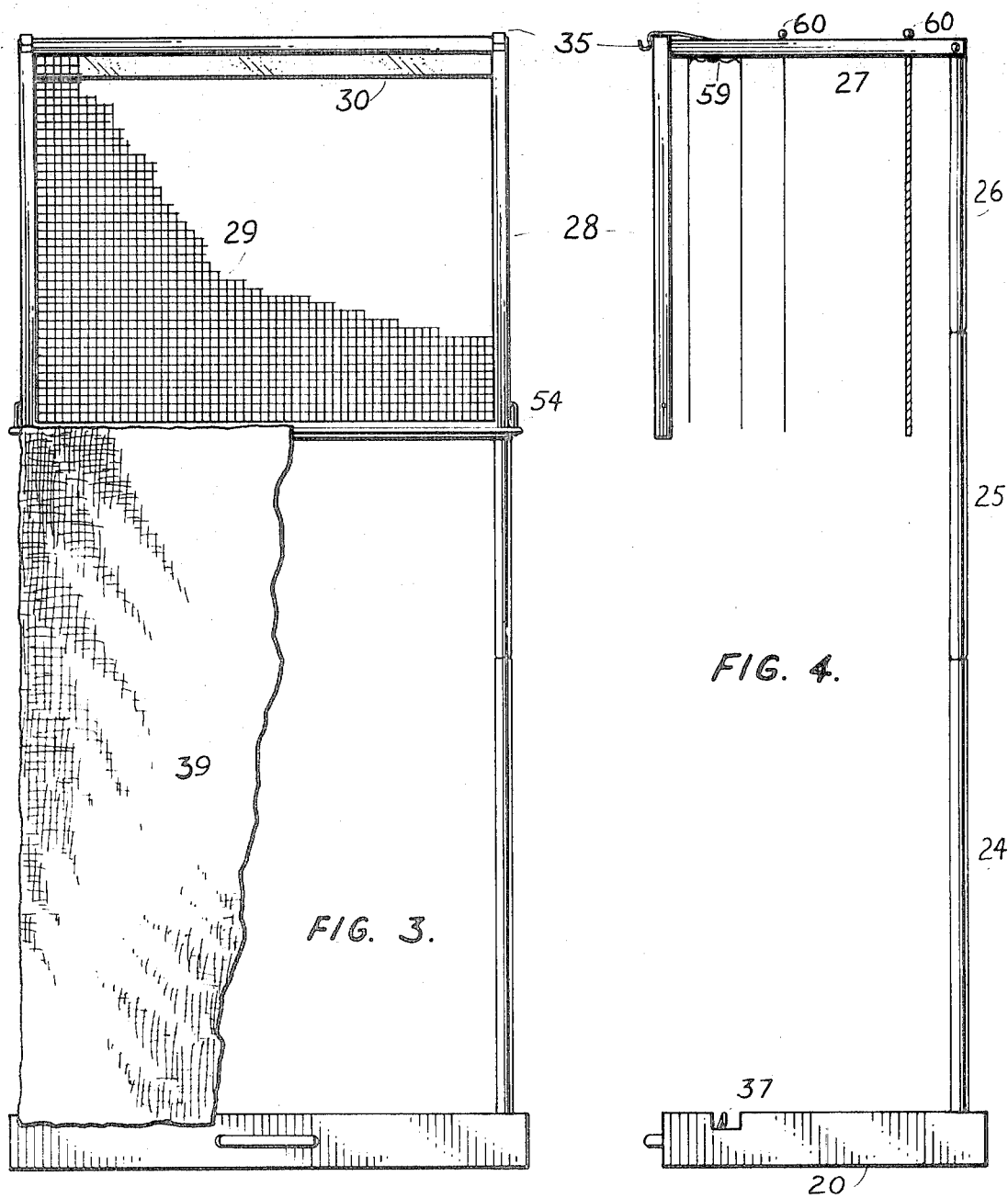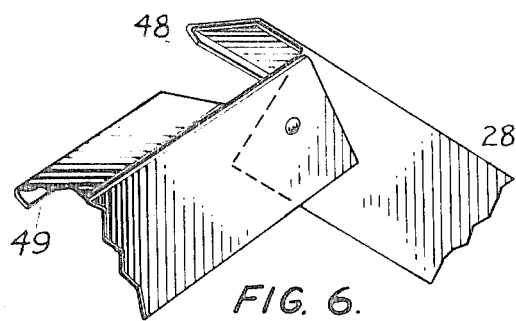

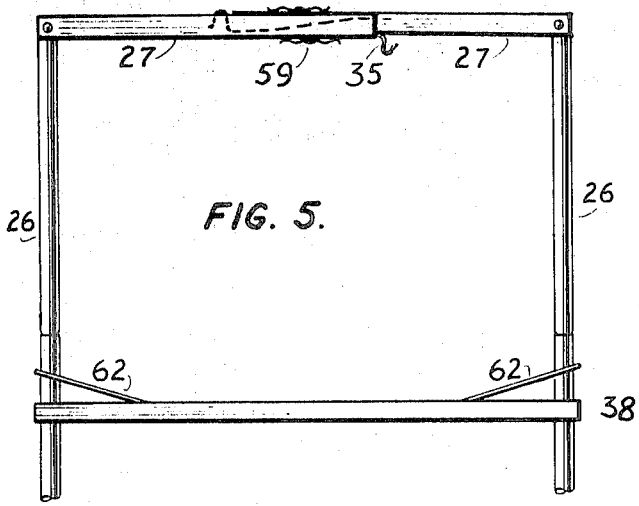
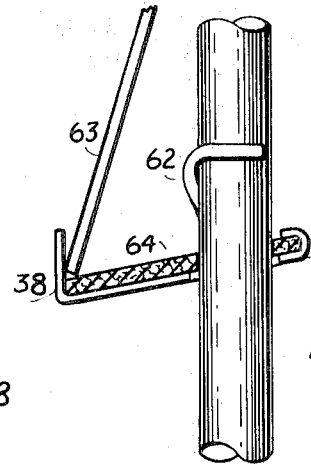
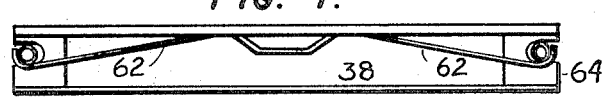
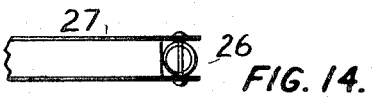
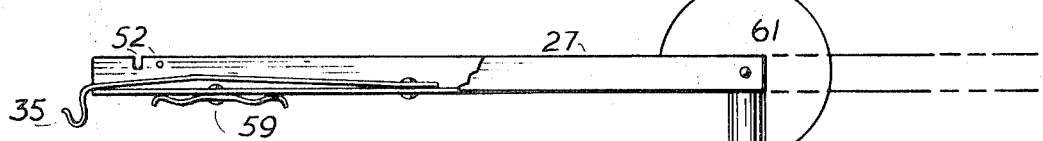
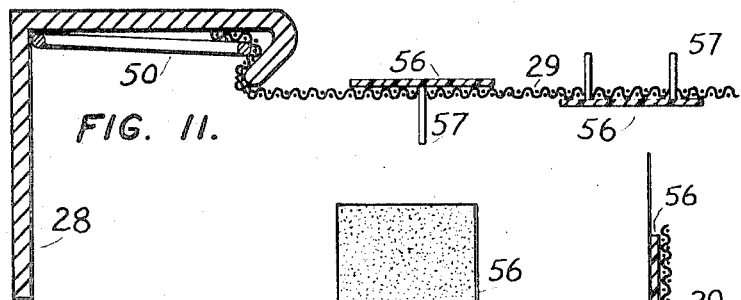
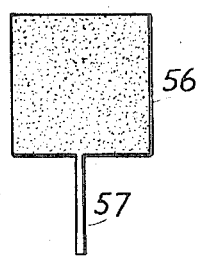
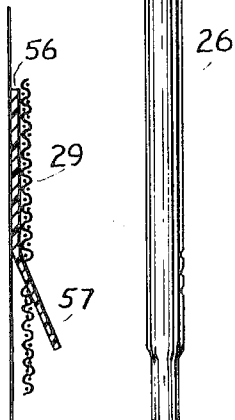
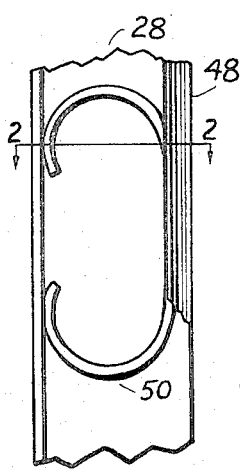

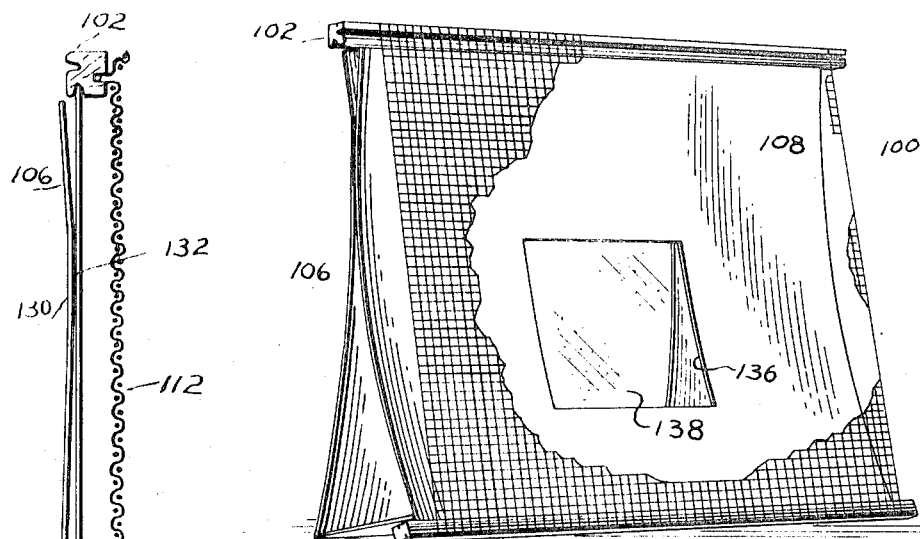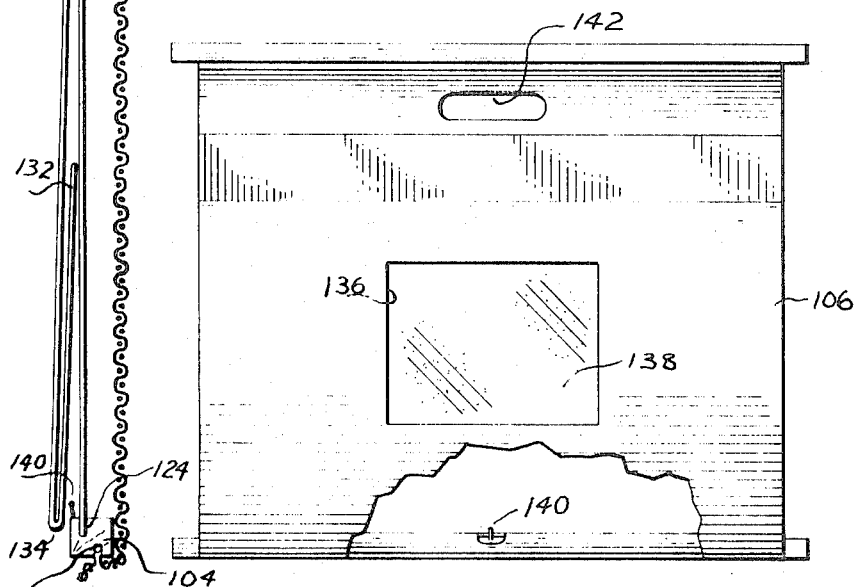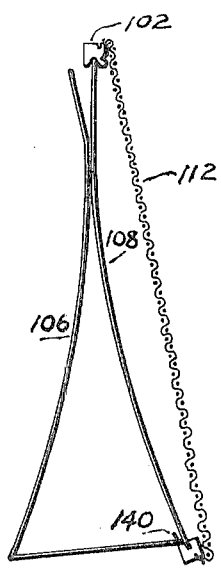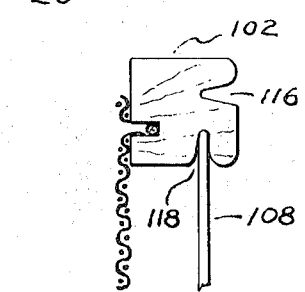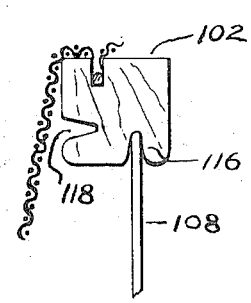

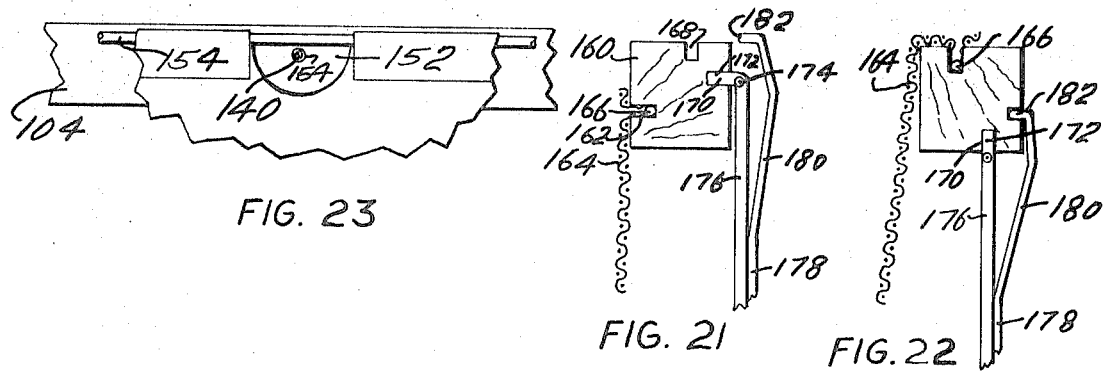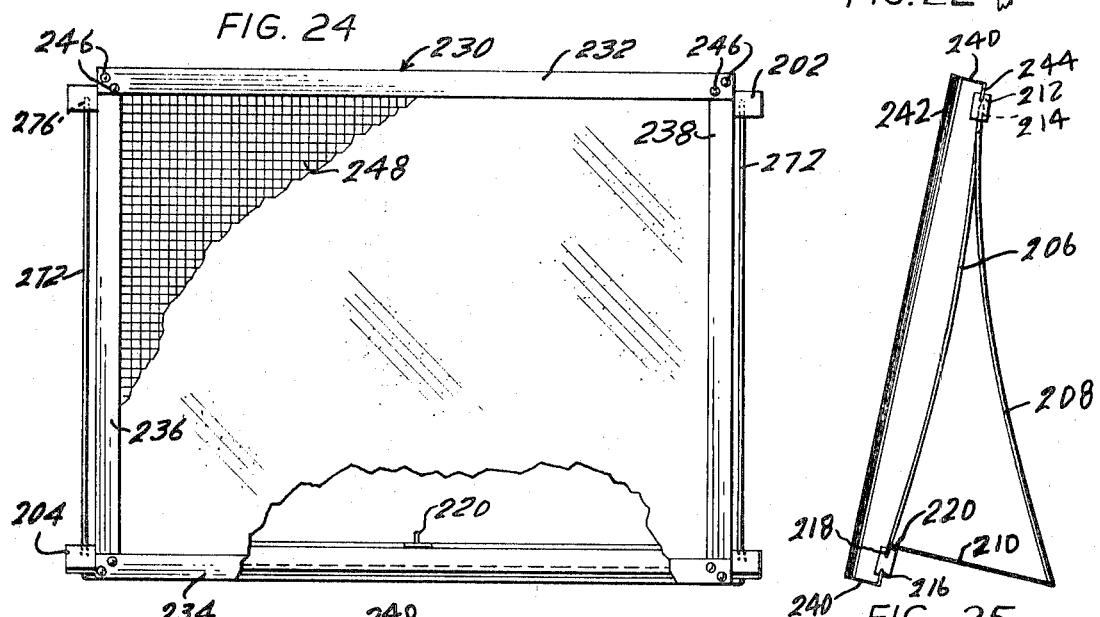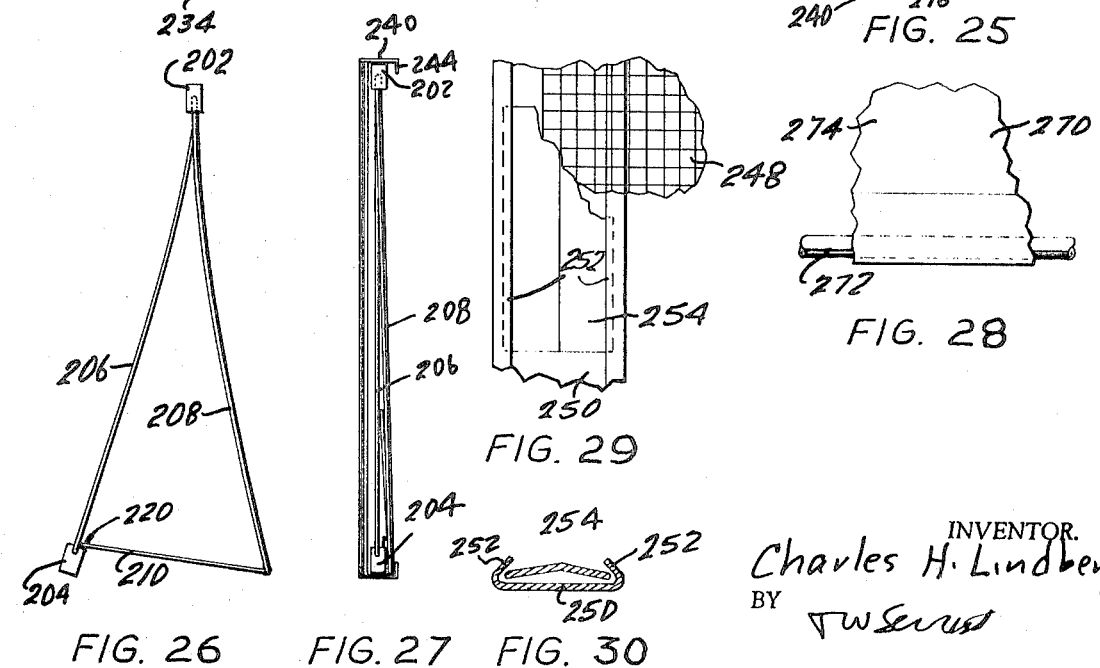

3,618,175
VISUAL AID
Charles H. Lindberg, 2038 NE. 123rd,
Seattle, Wash. 98125
Continuation-in-part of application Ser. No. 571,367,
Aug. 8, 1966. This application Dec. 23, 1968,
Ser. No. 786,336
Int. Cl. A44b 21/00, 19/00
U.S. Cl. 24—73 R                                     4 Claims

ABSTRACT OF THE DISCLOSURE

This invention relates to an inexpensive, easily handled and easily stored visual aid which can be used to give a three dimensional appearance. The invention comprises a mesh and upright supports for supporting the mesh. Also, there is a flexible tab to assist in positioning a picture or an object in front of or back of the mesh to assist in giving the three dimensional effect.

---

This invention is a continuation-in-part of my copending patent application, Ser. No. 571,367, filing data of Aug. 8, 1966.

This invention relates in general to education and more particularly to visual aids with all components contained in one portable package approximately the size of a suitcase. This invention is particularly useful in the field of education.

An object of the invention is to provide persons engaged in the art with versatility of method in visual presentations contained in one unit.

Another object of my invention is to make it possible to use a variety of backgrounds with ease of changing the same, one of which is projected slides and superimposed pertinent material over the same with a resulting three dimensional effect.

Another object of my invention is to provide an easel with sturdy base, ease of adjusting a supporting tray, and a horizontal member across the top, as these mentioned features have been lacking in prior easels of the portable type.

Another object is to reduce storage space and to make it easy to transport and set up.

Further, additional objects of this invention are to provide a means for three dimensional visual presentations to small groups for instructional purposes, such as educational purposes and sales purposes; to provide a means of three dimensional advertising in a store window display or display in a showcase; to provide a mesh screen which will serve as an overlay on wall maps and the like so as to give a three dimensional effect to the wall map; to provide an inexpensive means for displaying greeting cards; to provide a three dimensional display means which is light in weight and can quickly be set up for table use or can be hung on the wall; and, to provide a three dimensional display means which is compact and can be folded flat for storage purposes.

Further objects and a fuller understanding may be had by referring to the following description and claims in conjunction with the drawings, in which:

FIG. 3 shows the front elevation of the set up for puppet shows and behind screen presentations;

FIG. 4 is a side elevation of the set up for using paper, cloth, plastic and the like for backgrounds. It also shows how it can be used for a map or picture holder in front or behind the screen;

FIG. 5 is a front elevation of the upper portion of the visual aid to be used as an easel for holding a flip chart, chalkboard, art work or flannelgraph board;

FIG. 6 is a perspective view and enlarged to show the hinging action of the frame of the folding screen;

FIG. 7 is a plan view of the adjustable chalk tray for the easel;

FIG. 8 shows an enlarged view of the side elevation of the chalk tray;

FIG. 9 is a side elevation of the supporting arm and upper section of tubing;

FIG. 10 is a rear elevation view of a section of the screened frame shown in FIGS. 1 and 3 and which also shows the clip that holds the screen in place;

FIG. 11 is an enlarged cross sectional view taken along line 2—2 of FIG. 10; included are sectional views of holding tabs and the screen which holds figures in place for viewing;

FIG. 12 is a front elevation view of a holding tab with adhesive for attaching to objects for viewing;

FIG. 13 is a side elevation of a section of screen with a holding tab fastened to the back of an illustrative figure;

FIG. 14 shows a plan view of the upper tubing section and pivoting channel arm in support or horizontal position;

FIG. 15 is a side profile view of another preferred embodiment of the invention and shows the main components of the visual aid;

FIG. 16 is an isometric view of the visual aid in the upright position and illustrates the rear type mini-screen for viewing projects pictures and photographs as background;

FIG. 17 is a fragmentary rear elevation view of an upright visual aid and illustrates the interlocking mechanism;

FIG. 18 is a side elevation view illustrating the interlocking triangular base support, the upright support and the mesh;

Figure 31:
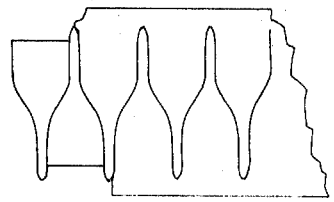
Figure 32:
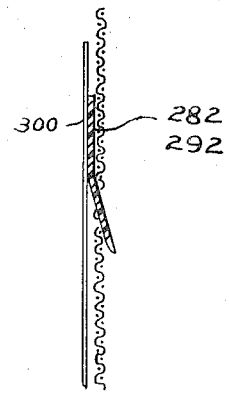
Figure 33:
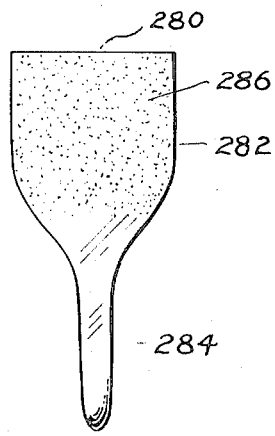
Figure 34:
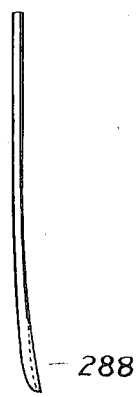
Figures 35, 36:
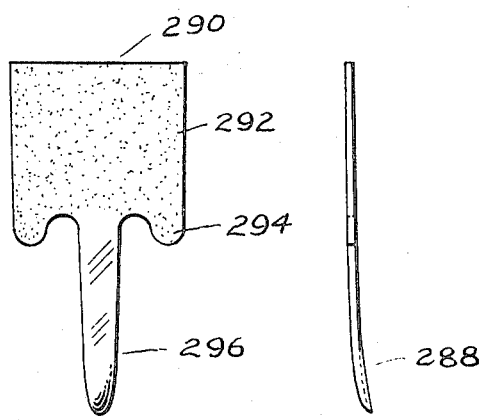

FIG. 19, on an enlarged scale, is a fragmentary side elevational view of the upper rail and illustrates the mesh and upright board in a rest position;

FIG. 20 is a fragmentary side elevational view of the upper rail and illustrates the visual aid in an upright position;

FIG. 21 is a fragmentary view of another locking mechanism for the upper rail and illustrates the visual aid in a rest position;

FIG. 22 is a fragmentary view of the upper rail and illustrates the locking mechanism and the visual aid in an upright position;

FIG. 23 is a fragmentary plan view illustrating the interlocking mechanism in locked position;

FIG. 24 is a fragmentary front elevational view of another preferred embodiment of the invention and shows the visual aid with the mesh screen, a translucent backboard in back of the mesh screen and which translucent backboard functions as a rear screen so that pictures may be projected onto said backboard;

FIG. 25 is a side elevational view illustrating the triangular base support for supporting the visual aid in an upright position;

FIG. 26 is a side elevational view of the interlocking triangular base support and illustrates the use of the support, independently of the screen, as a support for charts and the like;

FIG. 27 is a side elevational view of the triangular base support folded and inserted inside the mesh screen frame for storage purposes;

FIG. 28 is a fragmentary plan view of a portion of the hinging method at the base of the triangular support;

FIG. 29 is a rear elevational view of a portion of the mesh screen frame for the visual aid;

FIG. 30 is a lateral cross sectional view taken on line 30—30 of FIG. 29 and illustrates the flexible and semiflat material employed to hold the mesh screen under a reverse bend;

FIG. 31 is a front view of hooking whisker tab in a strict form;

FIG. 32 is a fragmentary side elevational view showing how the hooking whisker tab adheres to a plate to be positioned on the screen and illustrates the whisker portion of the tab projecting through the open mesh of the screen;

FIG. 33, on an enlarged scale, is a front view of the hooking whisker tab and illustrates the main body of the tab and whisker portion;

FIG. 34 is a side elevational view of the hooking whisker tab and illustrates the curved whisker portion for ease in projecting the curved whisker portion through the openings in the mesh of the mesh screen;

FIG. 35 is a front elevational view of another preferred embodiment of the hooking whisker tab and illustrates the main body with two depending flanges and hooking whisker tab; and, FIG. 36 is a side elevational view of the hooking whisker tab of FIG. 35.

Figures 1, 2:
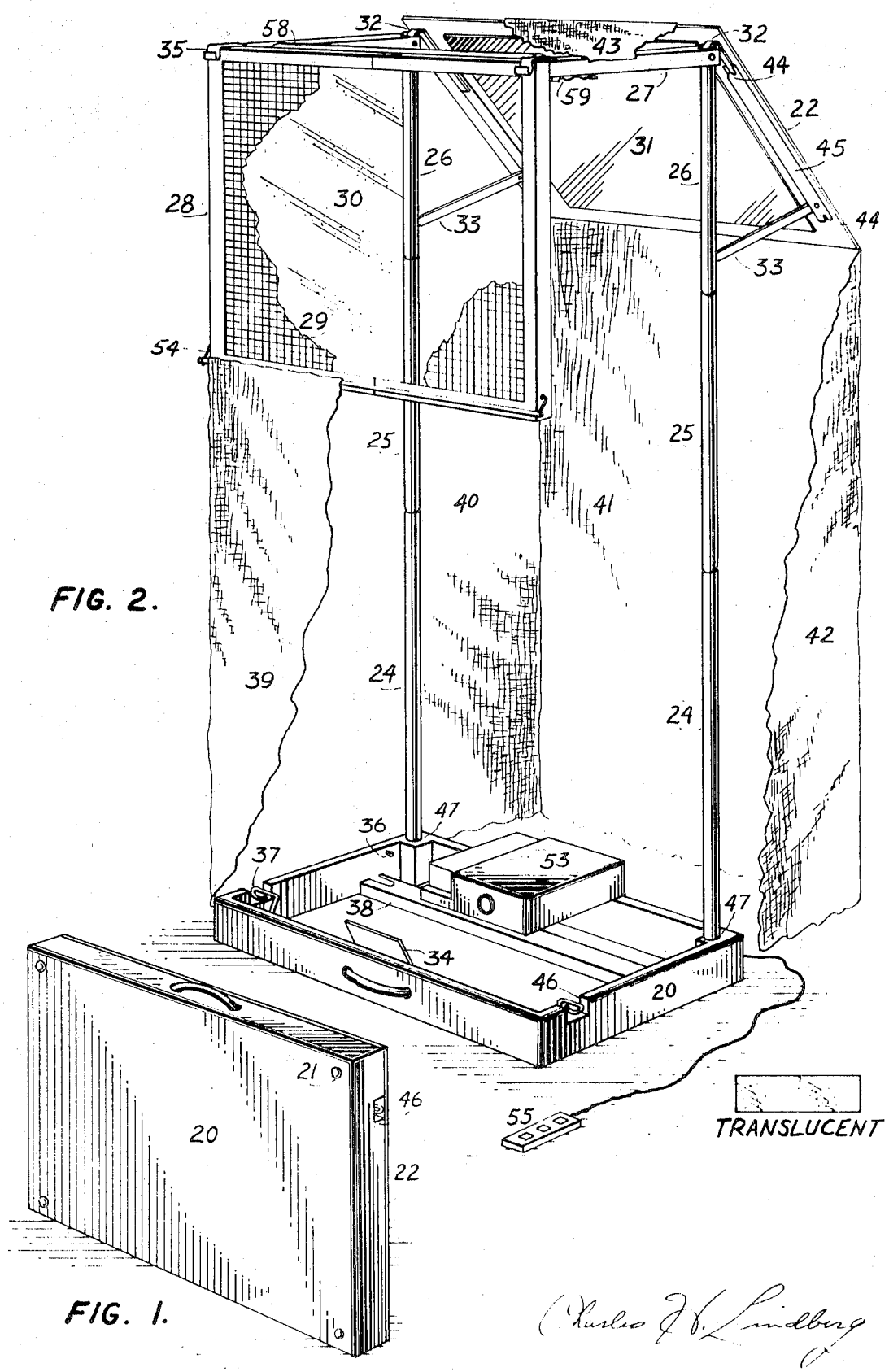
FIG. 1 is a perspective view of the complete visual aid self contained package.
FIG. 2 shows a perspective view of the most elaborate of all the possible set ups. This involves the use of a remote control projector to provide backgrounds for the daylight visual presentation.

With reference to my drawing, the complete mechanism (excluding the slide projector) is embodied in the self-contained unit shown in FIG. 1. This unit consists of a suitcase styled container 20 which serves as a base for the erected visual aid, a cover 22 to enclose the mechanism and a handle 23 for ease in transporting. Enclosed in this unit are two aluminum tubing uprights divided into three sections each, 24, 25, and 26. Attached to tubing sections 26 is an arm 27 used for supporting folding frame 28, screen 29, rear screen 30, and other material or backgrounds that may be used. The mirror 31 is fastened on the inside of lid 21 which in turn is mounted at the top and rear of the assembly by means of hooks 32 and struts 33. Mirror 34 is hinged on the bottom of base 20.

Tray 38 is placed in position on upright tubing supports as indicated in FIG. 5 or used as a projector support in FIG. 1. Five light weight curtains 39, 40, 41, 42, and 43 enclose the entire mechanism or in part as needed.

The base of the mechanism is formed by placing the entire unit 20 with the four glides 21 on the floor. The glides being placed on the bottom for easier movement. Wood or other suitable material is used for the container so as to provide a substantial, trim, rectangular base.

The cover, of a suitable material such as fiberboard is removed by releasing spring latch levers 37 from engagement in slot 44 of cover bracket 45 by means of inserting forefingers in cutout 46 and drawing spring catches forward. Cover bracket 45 is constructed of suitable metal angle with slots 44 at both ends and secured to the cover by means of fasteners such as rivets. Therefore, continue to raise cover and release back slots 44 of cover bracket 45 from retaining screws 36.

Remove tubing sections 24, 25, and 26. Insert sections 24 in sockets 47 which can be sized holes in wood with reinforcing metal plate on top. Insert swaged ends of tubing sections 26 into tubing sections 25 to form the full height upright supports.

Channel support arms 27 operating in a manner similar to a jackknife should be moved from the folded position and rotated 270° to a stopping point at 90° to tubing 26 or at a horizontal position.

Screen frame 28 and screen 29 are stored in a folded position made possible by the self-contained hinge, the interaction of which is shown in FIG. 6. The frame can be constructed of aluminum angle and the screen may be nylon mesh screen. Picture, figures and other small illustrative materials can be stored in between the folded screen. Open screen frame 28 and allow lip 48 to engage with its counter half 49 thus holding it in a straight open position. Place the opened screen in position by raising spring holders 35 and allowing frame 28 to rest on support arms 27; spring holder 35 should now return to the down position as shown in FIG. 2. The mesh screen 29 is held taut and in position by springy clips 50 shown in FIGS. 10 and 11. These springy clips are located on the inside of the screen frame 28 and are spaced at intervals sufficient to hold screen mesh in place. Said clips are easily removed thereby making possible easy replacement or adjustment of screening. Springy clips 50 are removed by finger pressure on curves with outward pull thereby releasing tension on screening under lip 48. Said clips 50 are placed in position merely by locating and pressing into place. No clips are placed in the middle so as to interfere with hinge for folding said frame and screen.

Mirror 31 is fastened to the inside of cover 22 by means of suitable clips or adhesive. It is mounted in the upper rear position at a 45° angle by means of hooks 32 which engage in the top of tubing 26. Folding struts 33 attached to cover bracket 45 are positioned into holes 51 in tubing 26. Several holes are spaced at close intervals to provide for adjustment of mirror 31.

Rear screen 30 consisting of a suitable translucent material for projecting an image on it is hung behind the mesh screen 29 by means of suitable roller 58 such as used by the well-known window shades having ends engaged in notches or holes 52 in supporting arms 27.

Mirror 34 is raised into position which is held by hinge on the bottom of base 20 and supported by side of the base at a suitable angle in relation to mirror 31 and rear screen 30.

Projector 53 is placed in position at rear center, resting on back side of base and on chalk tray 38 at the bottom of base 20. The front of the projector can be raised or lowered in the usual manner for framing picture on screen.

The visual aid is enclosed by light-weight opaque curtains 40, 41, 42, and 43 hung by suitable hooks from arms 27 and cover 22. Curtain 39 is hung by a telescoping rod fastened at the ends by hooks 54 inserted in holes in frame 28.

Focusing and changing of the picture can be accomplished from the exterior by remote control 55 in the accustomed manner.

A visually illustrated talk may now begin by projecting slides on the rear screen 30 for a background to the material presented in the foregoing on mesh screen 29. For example: a presentation on lumber and wood products may be given. Tree scenes in their natural setting can be shown by slides projected on the rear screen and lumber, wood products, methods of manufacture and distribution may be discussed in the foreground.

Tabs 56 made of plastic or other suitable material with one or more whiskers 57 on the one side and adhesive on one surface make it possible to adhere these to the back of any light-weight figures, and the like, and in turn hang these on screen 29 as shown in FIG. 13 with the whisker 57 projecting through an opening in the screen. The main purpose of the picture projecting feature of this invention is to provide backgrounds that are easily changed and relevant to the material presented in the foreground. By this process the presentation is interesting, active and adds a third dimension.

The tabs 56 may be manufactured by molding, stamping or fabricating. If they are made of transparent material, they can be used on the front of a figure so as to hang the said figure behind the screen for behind the screen presentations as well as in front of the screen presentations.

To set the visual aid up for use for a hand puppet show, remove the back curtain 41, projector 53, cover 22 along the mirror 31. Leave rear screen 30 in position as it can be used for a curtain to be raised or lowered by means of the roller 58. The view of the front elevation in FIG. 3 illustrates the visual aid prepared for the puppet show. Foreground scenery may be placed on inside or outside of screen 29 by use of tabs 56. Other scenery, drop curtains and props of various kinds can be suspended from above by means of rods or other means supported by arms 27. The puppeteers may stand inside of base 20 or move in and out as necessary.

One or more individuals can give what simultates a live television presentation or live puppet show by performing on the inside of screen 29 while another person gives a presentation on the outside by using visuals and attaching them to the screen by use of tabs 56. Thus, similar to the manner in which television commercials are superimposed over a picture.

The rectangular design of my invention makes it readily adaptable as a loose page map or picture holder. Raise spring holders 35 and place map under spring holders and return same to down position. If desired a clear plastic overlay may be placed over map or picture for the purpose of illustrative writing by operator.

To obtain a three dimensional effect, maps, pictures or other graphic materials may be hung behind the screen 29 by means of two flat spring clips 59 attached to support arms 27 as shown in FIG. 4. A series of background picture planes may be formed by adding more clips 59 or by suspending them from a suitable rod 60 placed across support arms 27. These picture planes are independent of each other and therefore are easily removed or exchanged without disturbing the figures on mesh screen 29 in front. Backgrounds already prepared for flannelgraph, well known to the art, can be readily used by hanging in the manner described. Flannelgraph figures are easily adapted to use on the visual screen merely by attaching a tab or tabs 56 to the back of the figures.

The assembly can be prepared for use as an easel for drawing, illustrating, and the like by turning the base 20 with tubing uprights in place around 180° to the front, by turning both support arms 27 to the right and rotating said arm on the right 180° over pivot point 61 so that it will engage with other said support arm 27 to the right and rotating said arm on the right 180° over pivot point 61 so that it will engage with other said support arm 27 to form a cross support at right angles to said tubing uprights as shown in FIG. 5. Tray 38 can be placed in position by holding spring torque levers 62 with thumbs while supporting said tray with hands; open end slots may be slipped over said tubing upright on the left and on the right or conversely, release spring torque levers 62 and said tray 38 will be held in place. Any additional weight placed near the front edge of said tray, such as a board 63, will only tend to increase the bind or gripping action of fiber inserts 64 against said upright tubing. Tray 38 can be easily raised or lowered to any position from top to bottom by placing hands near ends of tray with thumbs releasing pressure of said spring torque levers 62 against tubing uprights, and tilt the front edge of the tray upward to a level position to release bind of fiber 64 against said tubing. This frees the tray for easy movement. Small up or down adjustments can be made with one hand by grasping the center of the tray and tilting the front edge up to release binding action of fiber 64 against said tubing and allowing spring torque levers 62 to slide along upright tubing surface.

Locate tray 38 in desired position and place cover 22, which has been painted with chalkboard slate type paint, in position on tray 38 to serve as a workable chalkboard. A drawing pad, paper or the like may be placed in position over the chalkboard for art work.

Flip charts or the like may be placed on the easel tray and because of the horizontal cross bar at the top it is very easy to flip pages over the top. Prior easels with only a center piece or tripod arrangement give little support to a chart and makes it very difficult to flip pages over the top.

All of the foregoing operations, except the use of the projector can be done on a table top by removing tubing section 25. Also, a lower or child's size set up can be obtained by removing tubing section 25.

In the drawing, and, in particular, FIGS. 15–20 there is illustrated a visual aid 100. The visual aid 100 comprises an upper rail 102, a bottom rail 104, a back support 106, a background board 108, an interlocking flap 110, and a mesh screen 112.

The background board 108 connects the upper rail 102 and the bottom rail 104. Also, the mesh screen 112 connects the upper rail 102 and the bottom rail 104.

In FIG. 19 there is illustrated the upper rail 102. The upper rail 102 in an end view gives the general outline of a square. On the left half of the surface there is a screen slot 114. On the right hand surface, i.e., that surface opposed to the left hand surface, there is a support slot 116. On the surface between the left surface and the right surface there is the rest slot 118. In the end view the screen slot appears to be of a generally rectangular configuration and, in the end view, the support slot and the rest slot appear to be of a generally triangular configuration.

The mesh screen 112 is positioned in the screen slot 114 by means of rod 118. It is seen that the rod 118 is forced into the screen slot 114 with the mesh screen between the rod and the screen slot so as to position the mesh screen 112.

In the rest position the background board 108 is in the rest slot 118, as illustrated in FIG. 19. In the support position the background board 108 is in the support slot 116, as illustrated in FIG. 20, and with the screen slot 114 directed upwardly.

In FIG. 15 there is illustrated the bottom rail 104 having a screen slot 120. In the bottom rail 104, the screen slot 120 is directed downwardly. The mesh screen 112 is positioned in the screen slot 120 by rods 122.

Also, in the bottom rail 104 there is a board positioning slot 124. The board positioning slot 124 and the screen slot 120 in an end view give a generally rectangular appearance. The background board 108 is positioned in the board positioning slot 124.

As illustrated in FIG. 15, there is a back support 106. The back support 106 is curved and with the apex of the curve, 130, bearing against and connected with the back surface of the background board 108 by means of an adhesive 132 or other appropriate adhering means. The length of the back support 106 is a little less than the background board 108. At its lower end the back support bends into an interlocking flap 132. The connection between the back support 106 and the background board 108, connection 134, is flexible so as to allow the interlocking flap 132 to move and rotate with respect to the back support 106.

In the background board 108 there is an opening 136. There covers opening 136, and on the back face of the background board 108, a translucent window 138. The translucent 138 may be pressed tightly against the back face of the background board 108 or may be allowed to hang freely.

On that portion of the bottom rail 104, and in back of the background board 108 and hidden from view there is a tank 140.

In the upper part of the back support 106 there is a hand slot 142 for ease of carrying the visual aid 100.

In FIG. 15 the visual aid 100 is illustrated in a rest position. In FIGS. 16 and 18 the visual aid 100 is illustrated in the upright or erect position.

It has been previously explained that the position of the upper rail 102 with respect to the background board 108 in the rest position is illustrated in FIG. 19; and, the position of the upper rail 102 with respect to the background board 108 in the upright or erect position is illustrated in FIG. 20. Also, the visual aid in the position of the upright rail and the background board 108 in the rest position is illustrated in FIG. 15; and, the position of the visual aid 100 and the upper rail 102 and the background board 108 are illustrated in the upright or erect position in FIG. 18.

In FIG. 18 there is illustrated the use of the peg 140 to position the interlocking flap 132 so as to have the visual aid 100 in an upright position. It is seen that the outer edge or free edge of the interlocking flap 132 bears against the peg 140.

In FIG. 23 there is illustrated another manner of positioning the interlocking flap with respect to the bottom rail 104. More particularly, in this instance the interlocking flap is given reference numeral 150. On the bottom rail 104 there is the peg 140. The interlocking flap 150 has a reinforcing plate 152 and a hole 154 in the reinforcing plate. The reinforcing plate 152 and the hole 154 are positioned over the peg 140 so as to definitely position the interlocking flap 150 with respect to the lower rail 104. It is seen that the free edge or outer edge in the interlocking flap 150 has a rod 154 for reinforcing and stiffening purposes.

In FIGS. 21 and 22 there is illustrated another means for positioning an upper rail 160 in the rest position and in the support position. In the upper rail there is a screen slot 162 for positioning a screen 164. Also, a rod 166 positions the screen 164 in the screen slot 162. As is seen in FIGS. 21 and 22 in an end view, the upper rail 160 is of a generally rectangular configuration with four faces. The screen slot 162 is in the left face. On the upper face there is the support slot 168. On the right face or the face opposite the face in which there is the screen slot there is a slot 170. In the slot 170 there is a lever arm 172. The lever arm 172 is rotatively pinned by 174 to the background board 176. There is attached to the background board 176 the back support 178. The upper end of the back support 178 projects into an arm 180. The arm 180 bends into a hook 182. As is illustrated in FIG. 21 in the rest position of the visual aid, the screen slot 162 is pointed outwardly and the support slot 168 is pointed upwardly. In the support position, see FIG. 22, the upper rail 160 has been rotated so that the screen slot 162 is directed upwardly and the support slot 168 is directed outwardly and the hook 182 is in the support slot 168 so as to definitely position the upper rail 160 and restrict the movement of the upper rail 160. In other words, the arm 180 and the hook 182 in conjunction with the support slot 168 lock the upper rail 160 on the lever arm 172.

In FIGS. 24–30 there is illustrated another visual aid 200. This visual aid 200 comprises an upper rail 202 and a lower rail 204.

There is a background screen 206, a back support 208 and an interlocking flap 210.

The upper rail 202, in an end view, is of a generally rectangular cross sectional configuration, and in the upper surface there is a slot 212 and in the lower surface there is a slot 214.

The background screen 206 and the back support 208 fit into the slot 214 so as to be definitely positioned in the slot 214.

The bottom rail 204, in an end view, is of a generally rectangular configuration. In the lower surface of the bottom rail 204 there is a slot 216 and in the upper surface there is a slot 218. The lower edge of the background screen 206 fits into slot 218.

On the upper back part of the lower rail 204 there is a peg 220. The interlocking flap 210 has a construction illustrated in FIG. 23 and the reinforcing plate 152 and the hole 154 fit over the peg 220, as is illustrated in FIG. 25, to definitely position the back support 208 with respect to the lower rail 204. The interlocking flap 210 is hingedly connected at its inner end to the lower end of the back support 208. Therefore, the interlocking flat 210 can rotate or move with respect to the back support 208.

The visual aid 200 comprises a frame 230, an upper rail 232, a lower rail 234, a left stile 236 and a right stile 238. Both the upper rail 232 and the lower rail 234 are of a U-channel configuration having a base 240, a front leg 242 and a rear leg 244. The stiles and rails are joined by rivets or pins 246.

As is illustrated in FIG. 24, the frame 230 carries a mesh screen 248.

In FIG. 25 it is seen that in the support or erected position that the leg 244 of the upper rail 232 fits with the slot 212 in the upper rail 202 and, in FIG. 25 it is seen that leg 244 of the lower rail 234 fits in the slot 216 of the lower rail 204.

In FIG. 25 there is illustrated the visual aid 200 in an upright position with the frame 230 on the front of the rails 202 and 204. In this position it is seen that it is possible to place material on the front of the mesh screen 248, in back of the mesh screen 248 and on the background screen 206 so as to have a three dimensional appearance and presentation.

In FIG. 26 there is illustrated a portion of the visual aid 200 in an upright erected position and with the background screen 206, the back support 208, and interlocking flap 210 also in an upright position. In this position the party making the presentation can place objects to be viewed in front of the background screen 206.

In FIG. 27 there is illustrated the visual aid 200 in a collapsed or arrangement for storage.

The mesh screen is held between the stiles 236 and 238. Each of the stiles 246 comprises a base 250 and two upwardly and inwardly directed legs 252, see FIG. 30. There is positioned within these legs 252 a flexible clamp 254.

The mesh screen 248 may be stretched between the two stiles 236 and 238 and with the sides in the stiles 236 and 238. Then the clamp can be forced into the stiles and between the legs 252 so as to definitely and firmly position the mesh screen 248.

There may be used another type of background screen 270. The background screen 270 may comprise two rods 272 and a flexible screen 274.

In FIG. 24 it is seen that the background screen 270 is positioned in back of the frame 230 and at the ends of the rods 272 project into holes 276 in the upper rail 202 and the lower rail 204. This definitely positions the background screen 270 so as to allow material to be presented on the background screen 270. The background screen 270 may have a texture for receiving projected pictures, such as slides and film.

In FIGS. 33 and 34 there is illustrated a hooking whisker tab 280 having a main body 282 and a finger 284. It is seen that the length of the main body 282 and the finger 284 is substantially the same but that the width of the main body 282 is many times that of the finger 284. On the surface of the main body 282 there is an adhesive 286. In FIG. 34 it is seen that the finger 284 curves. Also, the central portion of the curved finger 284 is dished or cupped at 288.

In FIG. 31 there is illustrated a strip of hooking whisker tabs and the manner in which these hooking whisker tabs can be stamped on a strip of thin flexible, if desirable, translucent or transparent material such as cellophane, or a film or sheet of polyvinyl alcohol, polyethylene, polypropalene, polyvinyl chloride and other commercially available suitable plastics.

In FIGS. 35 and 36 there is illustrated another version of hooking whisker tab 290 having a main body 292, two depending flanges 294 on the edges of the main body 292 and a lnger 296. In FIG. 35 it is seen that the two depending flanges 294 are of relatively short length while the finger 296 is approximately the same length or slightly longer than the length of the main body 292. Also, the main body 292 is many times the width of the finger 296.

In FIG. 36 it is seen that the finger 296 curves slightly and also that the central position is dished at 298.

In FIG. 32 there is illustrated the use of the hooking whisker tab 280 or the hooking whisker tab 290 on a mesh screen 300. The finger 284 or 296 projects through the mesh screen 300 of a main body 282 and is on one side or juxtapositioned to the mesh screen 300. Then, on the other side of the main body 292 there is a picture or an exhibit or some other object 301. In FIG. 32 it is seen that the hooking whisker tab by means of a finger projecting through the mesh screen 300 and being adhered to the picture or exhibit holds up the picture or exhibit 301 for viewing purposes.

The hooking whisker tab is substantially coplanar as the thickness of the hooking whisker tab is very small in comparison with the length and width. Also, the hooking whisker tab is flexible as it is made from a flexible sheet of plastic and the finger can be readily moved or twisted so as to project through the mesh screen.

An illustration of the use of the hooking whisker tab is the positioning of Christmas cards and the like by means of the hooking whisker tab being adhered to the back of a Christmas card and then the finger of the hooking whisker tab projecting through a screen or mesh which has been positioned for displaying the Christmas cards.

Having presented my invention, what I claim is:

1. A hooking whisker tab adapted to be employed in conjunction with a visual aid, said tab comprising a main body having an adhesive coating on one side thereof and having a finger of whisker-like configuration projecting therefrom and lying generally in the plane of the said main body, said tab being formed from flexible material, the free end of said tab being curved slightly away from the plane of said main body to present a dished-like configuration.

2. A hooking whisker tab as recited in claim 1, said main body of said whisker tab having a pair of laterally extending projections parallel to said whisker tab and on opposite sides of said tab and coated with adhesive to increase the surface contact of the adhesive portion of the hooking whisker tab.

3. A combination of a hooking whisker tab and a mesh screen comprising said mesh screen, said tab comprising a main body having an adhesive coating on one side thereof and having a finger or whisker-like configuration projecting therefrom and lying generally in the plane of the said main body, said tab being formed from flexible material, the free end of said tab being curved slightly away from the plane of said main body to present a dished-like configuration.

4. A combination according to claim 3 and comprising, said main body of said whisker tab having a pair of laterally extending projections parallel to said whisker tab and on opposite sides of said tab and coated with adhesive to increase the surface contact of the adhesive portion of the hooking whisker tab.

References Cited

UNITED STATES PATENTS

| 284,129 | 8/1883 | Heyl | 24—67 A UX |
| 1,648,408 | 11/1927 | Kumagai | 24—67 A UX |
| 1,756,241 | 4/1930 | Doebler | 24—11 F |
| 3,011,471 | 12/1961 | Tam | 24—67 A UX |

OTHER REFERENCES

| 876,761 | 8/1942 | France | 24—67 A |
| 936,527 | 2/1948 | France | 24—67 A |
| 831,373 | 2/1952 | Germany | 24—11 F |

DONALD A. GRIFFIN, Primary Examiner

U.S. Cl. X.R.

24—DIG 11; 35—60